May 4, 1954     G. CORNELIUS     2,677,560
SEALING AND SELF-DRAINING MEANS FOR PIPE COUPLERS
Filed March 25, 1950
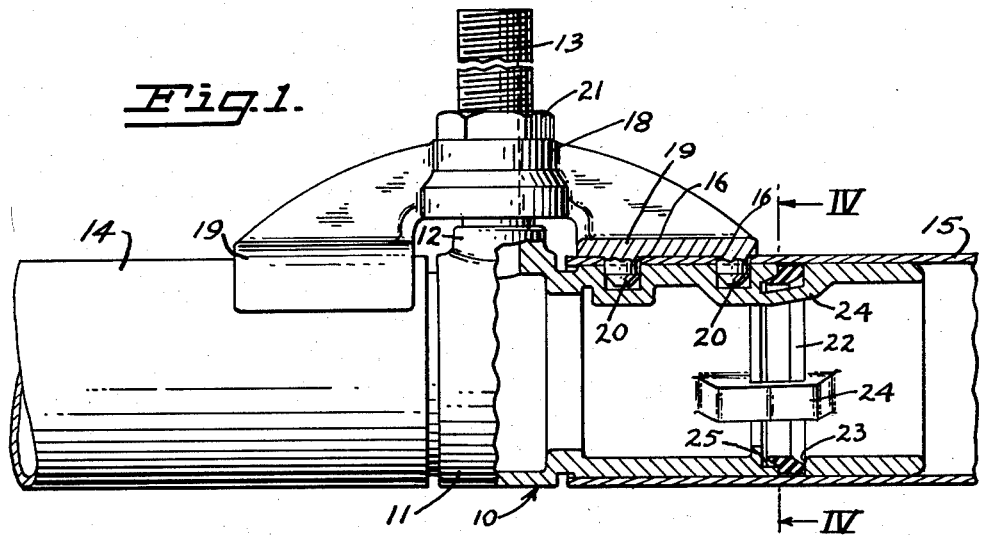
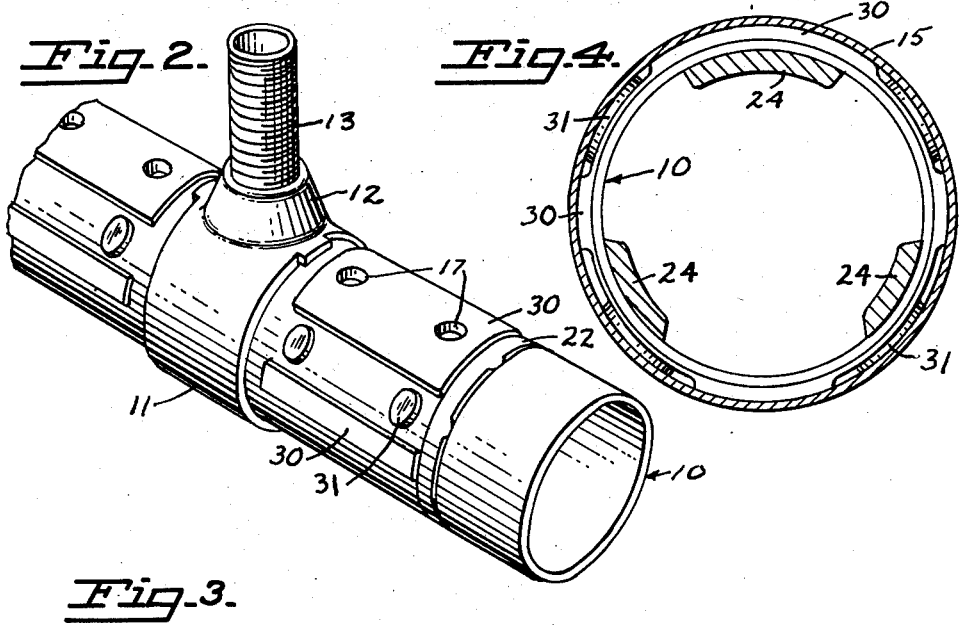
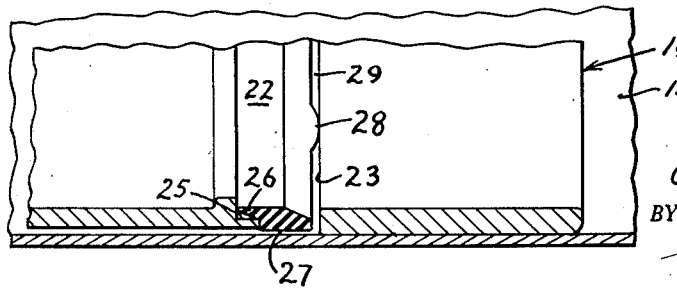
INVENTOR.
GAIL CORNELIUS
BY
Charles M. Fryer
ATTORNEY Patented May 4, 1954

2,677,560

UNITED STATES PATENT OFFICE 2,677,560

SEALING AND SELF-DRAINING MEANS FOR PIPE COUPLERS

Gail Cornelius, Portland, Oreg., assignor to R. M. Wade & Co., Portland, Oreg., a corporation of Oregon Application March 25, 1950, Serial No. 151,980

5 Claims. (Cl. 285—197)

This invention relates to coupling means for irrigation pipe or the like that is designed for use above the surface of the ground and adapted to be moved between various locations to be irrigated and pertains particularly to a combination seal and draining means to be used in conjunction with the couplings by means of which lengths of pipe are connected together.

In practice, irrigation pipe is sometimes moved in long sections consisting of several connected pipe lengths and as the sections often total five hundred feet or more it is customary to employ a tractor which drags the sections of pipe over the field from one location to another. It is necessary that the couplings which connect the individual lengths of pipe include some sealing means designed to withstand pressure from within and it is also desirable that each length of pipe or each coupling between lengths of pipe be provided with means to effect automatic draining of the water from the pipe when the pressure from within is reduced.

The requirement for these features is best appreciated from an understanding of a typical use of the long length or tractor move type of irrigation system. For example, a relatively permanent or main pipe line is disposed along one boundary of a field to be irrigated and has spaced outlets for the connection of a branch line adapted to extend across the field toward the opposite boundary. This branch line carries spaced sprinkler outlets and it is connected one after another with the spaced outlets of the main line so that the entire field will be irrigated. The branch line is moved from one outlet to the next by valving off its supply of water and then dragging it in sections of suitable lengths to position for connection to the next outlet. As the weight of the water in the line hinders its movement and as the line often lies upon uneven or rolling terrain, it is desirable to drain the line at each coupling immediately upon the failure of pressure resulting from its being valved off in preparation for moving. This system of draining is also superior to end draining because the discharge of a large volume of water at any single point is detrimental to certain types of crops and produces a muddy spot undesirable in cultivated fields.

The present application is concerned with a combination seal and drain means employed in a pipe coupling and the seal and drain means are disclosed herein in conjunction with a specific type of pipe coupling disclosed and claimed in my co-pending application entitled "Coupling Means for Irrigation Pipe," filed March 25, 1950, Serial No. 151,979, now Patent 2,541,208, issued February 13, 1951. The seal and drain means herein disclosed however, is not limited to use with this particular type of coupling and its adaptability to other types of couplings will be apparent from an understanding of the following specification.

It is the object of the present invention to provide a sealing and self-draining means operable between a pipe coupling and a pipe connected with it to form a fluid tight seal automatically upon the introduction of pressure into the coupling and to break the seal for permitting water to drain from the pipe when the pressure is reduced. The manner in which this object is accomplished and further and more specific objects and advantages of the invention are made apparent in the following specification by reference to the accompanying drawings.

In the drawings:

Fig. 1 is a view, one-half in side elevation and one-half in central vertical section, of a pipe coupling including a self-draining seal which embodies the present invention and illustrated with the ends of two lengths of pipe in place on the coupling, Fig. 2 is a fragmentary perspective view showing the same pipe coupling with the pipe ends and certain coupling parts removed, Fig. 3 is an enlarged fragmentary section through the seal as illustrated in Fig. 1, and Fig. 4 is a section taken on the line IV—IV of Fig. 1.

The coupling herein illustrated comprises a main coupling member, generally indicated at 10, of substantially cylindrical shape. The central portion of the coupling member is slightly enlarged, as indicated at 11, and has a boss 12 formed thereon which is perforated and threaded for reception of an exteriorly threaded stand pipe 13. This stand pipe serves to support and direct water to a sprinkler head, not shown, and serves also in the assembly of the coupling as will presently appear. The ends 14 and 15 of two lengths of pipe to be connected by the coupling are shown in assembled relationship therewith in Fig. 1. The pipe ends slip over the tubular ends of the coupling and are provided with perforations 16 registering with depressions 17, see Fig. 2, when the pipe is in place on the coupling. A yoke member 18 fits over the stand pipe and has two saddle-like parts 19 overlying the ends of the pipe when it is assembled with the coupling. A pair of studs 20 is formed on each of the saddle parts 19 and these studs project through the holes 16 in the pipe and into the depressions 17 in the coupling to prevent separation of the pipe and coupling. A lock nut 21 is threaded on the stand pipe 13 and may be turned down against the top of the yoke 18 to complete the assembly and securely hold all of the parts in their assembled positions.

The sealing and self-draining means of the present invention comprises a gasket 22 fitted in a slot 23 which completely circumscribes the coupler adjacent its cylindrical end over which the pipe end is fitted, there being an identical gasket and slot in each end of the coupler. Separation of the coupler because of the circumscribing slot is prevented by bridges 24 shown as three in number and disposed interiorly of the end of the coupler in positions to span the slot.

The slot 23 is formed with a shoulder 25 facing inwardly of the coupler and the gasket which is resilient has a lip 26 sufficiently thin in cross-section to be forced outwardly into sealing contact with the shoulder 25. The main portion of the gasket has an outer cylindrical surface, shown at 27 in Fig. 3, adapted to be pressed into sealing contact with the inner surface of the pipe 15. The gasket is slightly narrower than the width of the slot 23 and has an irregular edge formed by spaced projections 28 to engage the corresponding edge of the slot and provide intermediate openings 29. With the gasket in the assembled position illustrated in Figs. 1 and 3, the introduction of pressure into the pipe line expands it outwardly forming a seal against the shoulder 25 and a seal against the interior of the pipe 15. Thus, as long as pressure is maintained in the pipe line, water is delivered under full pressure through the stand pipe 13 and to the sprinkler head. However, when the pressure is reduced by valving off the line, the gasket contracts due to its resiliency and the water flows freely through the spaces 29 around the gasket and then outwardly between the end of the pipe and the outer surface of the coupler. To insure free flow of the water between the pipe and coupler while at the same time maintaining a snug fit between these parts, the coupler between the gasket and the end of the pipe is of slightly reduced diameter but formed with raised pads, such as indicated at 30 and 31. These form a rigid support for the inner wall of the pipe and provide intermediate passages for the escape of water. These pads may be of various shapes and arrangements but are herein illustrated as a combination of elongated bar-like members and interspaced discs.

Because of the reception of the gasket 22 in a slot which completely circumscribes the cylindrical portion of the coupler, it is completely protected in its contracted position against damage by the end of the pipe as it is slipped into place on the coupler. Also because of this positioning of the gasket, it expands readily into sealing contact with the interior of the coupler and the pipe and contracts immediately to permit the escape of water when the pressure is cut off. With the construction illustrated, an operator may close the valve which controls pressure between the main line and branch line and in a few seconds all of the water has been drained from the branch line in small quantities at each of the couplings therealong. Consequently there is no cause for delay in this proceeding to detach the branch line from the main line and couple it to a tractor for movement to its new location.

I claim:

1. A seal between a tubular fitting and a pipe which surrounds it comprising an annular gasket, said fitting having a circumscribing slot to receive the gasket spaced from one end and completely severing its wall, integral means inside the fitting bridging said slot to prevent separation of the severed parts, and a flange on the edge of the gasket farther from said end of the fitting to lie adjacent the inner surface of the fitting and to be urged thereagainst by pressure from within which pressure also urges the main portion of the gasket outwardly against the inside of the pipe.

2. A seal between a tubular fitting and a pipe which surrounds it comprising an annular gasket, said fitting having a circumscribing slot to receive the gasket spaced from one end and completely severing its wall, integral means inside the fitting bridging said slot to prevent separation of the severed parts, and a flange on the edge of the gasket farther from said end of the fitting to lie adjacent the inner surface of the fitting and to be urged thereagainst by pressure from within which pressure also urges the main portion of the gasket outwardly against the inside of the pipe, said fitting having a recessed shoulder on its inner surface for reception of said flange on the gasket.

3. A seal between a tubular fitting and a pipe which surrounds it comprising an annular gasket, said fitting having a circumscribing slot to receive the gasket spaced from one end and completely severing its wall, integral means inside the fitting bridging said slot to prevent separation of the severed parts, and a flange on the edge of the gasket farther from said end of the fitting to lie adjacent the inner surface of the fitting and to be urged thereagainst by pressure from within which pressure also urges the main portion of the gasket outwardly against the inside of the pipe, said fitting having a recessed shoulder on its inner surface for reception of said flange on the gasket, said integral means in the fitting also bridging said shoulder.

4. A seal between a tubular fitting and a pipe which surrounds it comprising an annular gasket, said fitting having a circumscribing slot to receive the gasket spaced from one end and completely severing its wall, integral means inside the fitting bridging said slot to prevent separation of the severed parts, and a flange on the edge of the gasket farther from said end of the fitting to lie adjacent the inner surface of the fitting and to be urged thereagainst by pressure from within which pressure also urges the main portion of the gasket outwardly against the inside of the pipe, said main portion of the gasket being of substantially the same diameter as the fitting.

5. A seal between a tubular fitting and a pipe which surrounds it comprising an annular gasket, said fitting having a circumscribing slot to receive the gasket spaced from one end and completely severing its wall, integral means inside the fitting bridging said slot to prevent separation of the severed parts, and a flange on the edge of the gasket farther from said end of the fitting to lie adjacent the inner surface of the fitting and to be urged there against by pressure from within which pressure also urges the main portion of the gasket outwardly against the inside of the pipe, said main portion of the gasket being of substantially the same diameter as the fitting but slightly narrower than the slot and having spaced projections on the edge opposite the flange to insure drainage space between the fitting and gasket when the pressure of fluid is too low to cause a seal.

References Cited in the file of this patent

UNITED STATES PATENTS

| Number | Name | Date |
|---|---|---|
| 255,523 | Lightburne | Mar. 28, 1882 |
| 1,153,824 | Pierce | Sept. 14, 1915 |
| 1,209,374 | Andreolli | Dec. 19, 1916 |
| 1,671,310 | Pence | May 29, 1928 |
| 2,082,164 | Karrer | June 1, 1937 |
| 2,465,708 | Chapin | Mar. 29, 1949 |
| 2,494,855 | Anderson | Jan. 17, 1950 |
| 2,510,477 | Montgomery | June 6, 1950 |
| 2,512,098 | Gratzmuller | June 20, 1950 |
| 2,517,290 | De Moude et al. | Aug. 1, 1950 |
| 2,541,208 | Cornelius | Feb. 13, 1951 |

FOREIGN PATENTS

| Number | Country | Date |
|---|---|---|
| 408,990 | Great Britain | Apr. 16, 1934 |